(12) United States Patent
Mordukhovich et al.

(10) Patent No.: US 8,551,576 B2
(45) Date of Patent: Oct. 8, 2013

(54) METHOD FOR CONTROLLING A COEFFICIENT OF FRICTION

(75) Inventors: Gregory Mordukhovich, Bloomfield Hills, MI (US); Jacob N. Israelachvili, Santa Barbara, CA (US)

(73) Assignees: GM Global Technology Operations LLC, Detroit, MI (US); The Regents of The University of California, Oakland, CA (US)

( * ) Notice: Subject to any disclaimer, the term of this patent is extended or adjusted under 35 U.S.C. 154(b) by 584 days.

(21) Appl. No.: 12/784,467

(22) Filed: May 20, 2010

(65) Prior Publication Data

US 2011/0287986 A1   Nov. 24, 2011

(51) Int. Cl.
 *B05D 1/04* (2006.01)
 *B05D 7/24* (2006.01)
 *H01F 1/00* (2006.01)
 *F16C 33/20* (2006.01)

(52) U.S. Cl.
 USPC ............ 427/475; 427/485; 427/550; 508/100

(58) Field of Classification Search
 USPC .......................... 508/100; 427/475, 550, 485
 See application file for complete search history.

(56) References Cited

U.S. PATENT DOCUMENTS

| | | |
|---|---|---|
| 2004/0150140 A1 | 8/2004 | Zhan et al. |
| 2007/0215841 A1 | 9/2007 | Ford et al. |
| 2008/0093577 A1 | 4/2008 | Khraishi et al. |
| 2009/0008712 A1 | 1/2009 | Choi et al. |
| 2009/0114883 A1 | 5/2009 | Collier et al. |
| 2009/0175757 A1 | 7/2009 | Yao et al. |
| 2010/0004147 A1* | 1/2010 | Mizrahi .................. 508/103 |

OTHER PUBLICATIONS

Akbulut, Mustafa, et al., "Frictional Properties of Confined Nanorods", Advanced Materials, 2006, 18, pp. 2589-2592.
Akbulut, Mustafa, et al., "Forces between Surfaces across Nanoparticle Solutions: Role of Size, Shape, and Concentration", Langmuir, 2007, vol. 23, No. 7, pp. 3961-3969.
Min, Younjin, et al., "The role of interparticle and external forces in nanoparticle assembly", Nature Materials, Jul. 2008, vol. 7, pp. 527-538.
Godfrey, Anna R., et al., "Forces between Surfactant-Coated ZnS Nanoparticles in Dodecane: Effect of Water", Advanced Functional Materials, 16, pp. 2127-2134.
Min, Younjin, et al.,"Normal and Shear Forces Generated during the Ordering (Directed Assembly) of Confined Straight and Curved Nanowires", Nano Ltrs, 2008,vol. 8,No. 1, 246-252.
Tian, Yu, et al., "Transient filamentous network structure of a colloidal suspension excited by stepwise electric fields", Physical Review E 75, 2007, pp. 011409-1-011409-6.

* cited by examiner

*Primary Examiner* — Cephia D Toomer
*Assistant Examiner* — Vishal Vasisth
(74) *Attorney, Agent, or Firm* — Dierker & Associates, P.C.

(57) ABSTRACT

A method for controlling a coefficient of friction involves applying a magnetic force, an electro-magnetic force, and/or an electrostatic force to nanoparticles disposed on a surface. The method further involves controlling a rolling-to-sliding ratio of the nanoparticles on the surface by i) adjusting a value of the force applied to the nanoparticles, and/or ii) adjusting an orientation of the nanoparticles by adjusting a direction of the force applied to the nanoparticles.

11 Claims, 1 Drawing Sheet

METHOD FOR CONTROLLING A COEFFICIENT OF FRICTION

TECHNICAL FIELD

The present disclosure relates generally to methods for controlling a coefficient of friction.

BACKGROUND

An example of an automatic vehicle transmission system includes a clutch assembly having sets of clutch plates that transmit a torque and/or other forces to a non-driving member. In some instances, the movement of the clutch plates may be affected by friction between the plates when adjacent plates contact each other. Traditionally, such friction may be controlled by disposing a lubricant between the clutch plates.

SUMMARY

Methods for controlling a coefficient of friction are disclosed herein. The method includes providing a plurality of nanoparticles on a surface, and applying a force to the plurality of nanoparticles. The force is a magnetic force, an electro-magnetic force, and/or an electrostatic force. The method further includes controlling a rolling-to-sliding ratio of the plurality of nanoparticles on the surface by i) adjusting a value of the force applied to the plurality of nanoparticles, and/or ii) adjusting an orientation of the nanoparticles by adjusting a direction of the force applied to the plurality of nanoparticles.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiment(s) of the method as disclosed herein may advantageously be used to control a coefficient of friction between two surfaces that contact and rub against each other (such as, e.g., a gear, bearings, clutch plates, and/or the like in an automotive transmission system). Without being bound to any theory, it is believed that control of the coefficient of friction may be accomplished by disposing a nanoparticle-based lubricant between the surfaces, and controlling a rolling-to-sliding ratio of the nanoparticles disposed between such surfaces.

The controlled coefficient of friction between the contacting surfaces may be advantageous, for example, for improving high torque transfer capabilities of, e.g., clutch plates in an engaged state in limited slip differential transmissions, torque converter transmissions, and dual clutch transmissions. In the engaged state, the majority of the torque transfer is supported by the nanoparticles, and thus it is particularly desirable to achieve and maintain a suitable fiction level during this state. Furthermore, controlling the coefficient of friction may reduce churning and viscous drag losses that tend to occur when an applied load on the clutch plates is removed. Such a reduction may also be due, at least in part, to the reduced viscosity of the nanoparticle fluid used. In many instances, the controlled coefficient of friction also achieves smoother shifting between the gears and/or controlled slip of the clutch plates.

Embodiments/examples of the method will now be described in conjunction with the figures. These embodiments/examples may be useful for achieving a controlled shift or slip in limited slip differential transmissions, torque converter transmissions, and dual clutch transmissions. It is to be understood however, that the method may also or otherwise be used in any application where a controlled coefficient of friction between two surfaces is desirable, e.g., to achieve smooth shifting, slipping, and/or the like between such surfaces. Some non-limiting examples of such other applications include other automotive applications, such as engines; medical applications, such as for artificial implants (e.g., knee joints, ankle joints, hip joints, etc.); semiconductors; and data storage devices (e.g., computer hard drives, flash drives, etc.).

Figure 1:
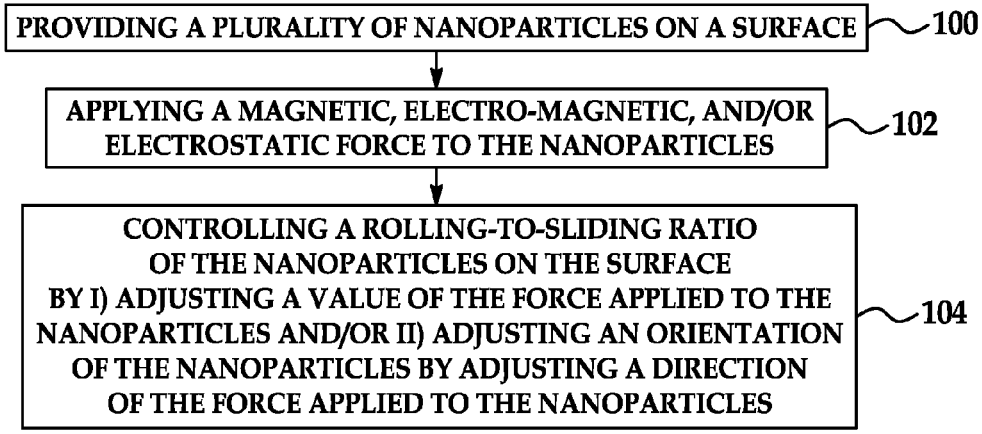
FIG. 1 is a flow diagram depicting an example of a method for controlling a coefficient of friction.
Figure 2:
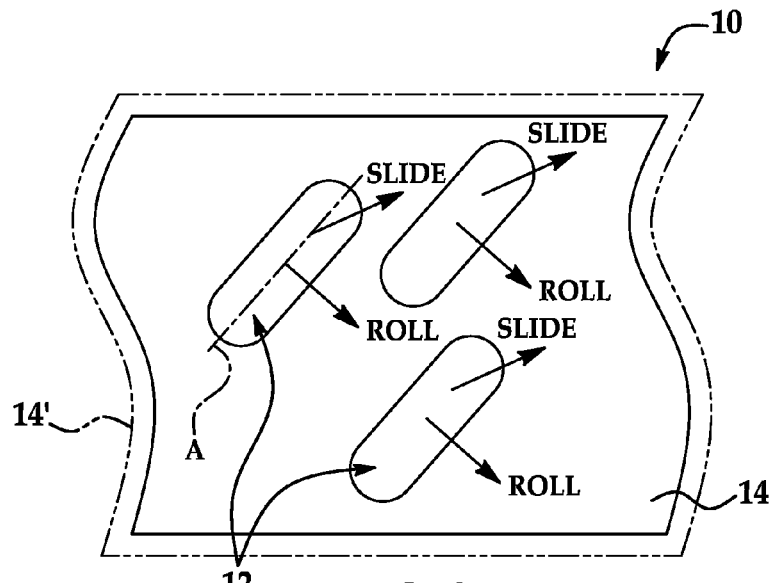
FIG. 2 schematically depicts an example of a lubrication system including a plurality of nanoparticles disposed on a surface, where differently applied forces change the orientation of such nanoparticles.
Figure 3:
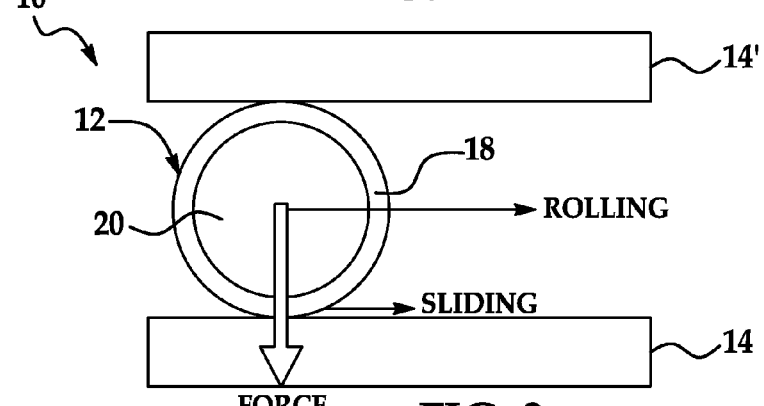
FIG. 3 illustrates an example of a lubrication system having a force applied normal to a surface upon which a nanoparticle is disposed, wherein such force does not change the orientation of the nanoparticle and the direction of rolling and sliding of the nanoparticle is the same.

Referring now to FIGS. 1-3, an embodiment of the method for controlling a coefficient of friction includes providing a plurality of nanoparticles 12 on a surface 14 (as shown by reference numeral 100 in FIG. 1), applying a magnetic, an electro-magnetic force, and/or an electrostatic force to the nanoparticles 12 (as shown by reference numeral 102), and controlling a rolling-to-sliding ratio of the nanoparticles 12 on the surface 14 by i) adjusting a value of the force applied to the nanoparticles 12, and/or ii) adjusting an orientation of the nanoparticles 12 by adjusting a direction of the force applied to the nanoparticles 12 (as shown by reference numeral 104).

Referring now to the lubrication system 10 shown in FIGS. 2 and 3, the surface 14 may be selected from any surface that may come into contact with and move relative to another surface (such as the surface 14' shown in phantom lines in FIG. 3). Some examples of the surface 14 and/or the surface 14' in automotive transmission systems include, but are not limited to transmission clutch plates, gears, drive shafts, other rotating shafts, sliding contacts, pistons in an engine, and/or the like. Other examples of the surface 14 include surfaces of artificial part joints such as, e.g., knees, ankles, wrists, hips, and/or other artificial anatomical parts. In an example, the surface 14 may be selected from one transmission clutch plate and the surface 14' may be selected from an adjacent transmission clutch plate. In this example, the clutch plates may contact and move relative to each other when the vehicle transmission is operating.

The nanoparticles 12 may be selected from any nanostructure having a surface (e.g., the surface of shell 18 as shown in FIG. 3) that allows the nanostructure to rotate in a substantially linear direction with respect to the surface in response to a force applied to the particles (such as when the surface 14 moves against the nanoparticles 12 disposed on the surface 14'). More specifically, when the surface 14 contacts and moves relative to the other surface 14', if moved properly, the nanoparticles 12 tend to roll (as opposed to slide) along the surfaces 14, 14'. Some non-limiting examples of such nanoparticles 12 include those that have a spherical/substantially spherical shape, those that have a cylindrical/substantially cylindrical shape (such as shown in FIG. 2 for example), and/or combinations thereof.

In an example, as shown in FIG. 3, the nanoparticles 12 include a nanoparticle core 20 having a shell 18 formed thereon. As will be described in further detail below, the nanoparticle core 20 may, in an example, be formed from a material that is responsive at least to a magnetic force, an electro-magnetic force, or an electrostatic force applied thereto. In a non-limiting example, the nanoparticle core 20 is formed from a ferromagnetic material that is responsive to a magnetic force. It is to be understood that the material selected depends, at least in part, on the application for which the examples of the method are used for (i.e., materials suitable for clutch or engine applications are different from materials suitable for artificial implant applications). Some non-limiting examples of suitable ferromagnetic materials that may be used for the nanoparticle core 20 for clutch or engine applications include ferrite, cobalt, and nickel. In another non-limiting example, the nanoparticle core 20 is formed from a material that is responsive to an electrostatic force. An example of such materials includes those that have a high permittivity, $\epsilon$, such as, e.g., cobalt and materials including iron (such as, e.g., $Fe_3O_4$).

The nanoparticle shell 18 generally encapsulates the nanoparticle core 20. Since the nanoparticles 12 are being used as a lubricant, the nanoparticle shell 18 should be formed from a material that exhibits low adhesiveness to the surfaces 14, 14'. Such low adhesiveness, for example, allows the nanoparticles 12 to slip (i.e., slide, but with reduced friction) relative to the motion of the surfaces 12, 12'. This generally reduces frictional losses related to micro-slipping based on the Hertzian contact and macro-slipping in instances where the angle between the rolling axis of the nanoparticle 12 and the motion vector of the surface 12 in the frictional pair deviates from 90°. In an example, the material selected for the nanoparticle shell 18 exhibits an adhesiveness ranging from about 3 kT to about 20 kT of adhesive energy per inter-particle interaction. Some non-limiting examples of materials exhibiting low adhesiveness include silanes, non-conductive carbon-based surfactants, non-conductive phosphorus-based materials, polymeric materials, hydrocarbons, fluorocarbons, or combinations thereof.

The nanoparticles 12 may be commercially available, or such particles 12 may be produced using any suitable method known in the art.

In an example, the size of the nanoparticles 12 ranges from about 0.1 micron to about 100 microns. It is to be understood, however, that the size of the nanoparticles 12 depends, at least in part, on the roughness of the surfaces 14, 14', and such particles 12 may thus have a size falling anywhere within the range recited above.

The nanoparticles 12 may be dry, dissolved in a suitable solvent, or suspended in a suitable medium. Some non-limiting examples of solvents/media include water, hydrocarbons, and the like.

The nanoparticles 12 may be disposed on at least a portion of one of the surfaces 14, 14' prior to the surfaces 14, 14' contacting each other. Although the nanoparticles 12 may be disposed on the surface 14, 14' in several layers, it is generally desirable to form a single layer (i.e., a monolayer) of the nanoparticles 12 because such particles may be more readily controlled by the applied magnetic, electro-magnetic, and/or electrostatic force(s). As such, the amount of nanoparticles 12 present will depend, at least in part, on the surface area to be covered. Furthermore, the amount of nanoparticles 12 present will also depend, at least in part, on the size of the nanoparticles 12 used, the type of lubrication, and/or the density of the lubrication liquid. In a non-limiting example, a single layer of lubricant may be obtained when the amount of nanoparticles 12 present is equal to about 1% of the photoweight of the lubricant medium.

As mentioned above, the nanoparticles 12 may be disposed as dry particles, particles dissolved in a solution, and/or particles suspended in a medium. Deposition of these forms of the nanoparticles 12 may be accomplished using any suitable deposition process known in the art.

Once the nanoparticles 12 have been disposed on one of the surfaces 14, 14', the movement of the nanoparticles 12 may then be controlled in order to adjust a rolling-to-sliding ratio of the nanoparticles 12 relative to the moving surface (which, for purposes of illustration, is surface 14). It is to be understood that when the nanoparticles 12 are in a pure rolling state (i.e., the nanoparticles 12 roll relative to the moving surface in one direction), such particles 12 do not undergo any sliding (except micro-sliding that may be due to the Hertzian load); and when the nanoparticles 12 are in a pure sliding state (i.e., the nanoparticles 12 slide relative to the moving surface 14 in another direction), the nanoparticles do not undergo any rolling. Both a pure rolling state and a pure sliding state of the nanoparticles 12 are depicted in FIG. 2 (via the arrows respectively labeled "ROLL" and "SLIDE"). Such pure states may be individually achieved by applying a particular force to the nanoparticles. In the examples disclosed herein, the state (i.e., ratio of rolling to sliding) of nanoparticles 12 may vary depending, at least in part, upon the orientation and value of the external magnetic, electro-magnetic, and/or electrostatic force that is applied to the nanoparticles 12 relative to the direction and value of tangential forces applied to achieve relative motion of the surfaces 14, 14'. In an example, such tangential forces may include attraction forces, such as friction forces that are opposite to the direction of the motion of the particles 12 during a pure sliding state. Typically, these friction forces would have to be overcome in order to achieve a pure sliding state, but do not have to be overcome to achieve a pure rolling state. Without being bound to any theory, it is believed that a ratio including more rolling than sliding of the nanoparticles 12 advantageously decreases the coefficient of friction. Accordingly, depending upon the application, it may be desirable to increase and/or decrease the rolling-to-sliding ratio of the nanoparticles 12 relative to the moving surface 14.

It is further believed that the adjusting of the rolling-to-sliding ratio may be accomplished by applying an appropriate force to the nanoparticles 12, and then adjusting i) the magnitude (i.e., value), and/or ii) the direction (i.e., angle) of the applied force. In a non-limiting example, the appropriate force may be applied to the nanoparticles 12 by passing a suitable electric current through one or more electro-magnets that is/are adjacent to the surface(s) 14, 14'. In automotive transmissions systems, the electro-magnet(s) may be placed behind the clutch plate, and the amount of force applied to the nanoparticles 12 may be controlled by adjusting the electric current passing through the electro-magnet(s). In an example, increasing the electric current alters the magnetic strength, which in turn increases the magnitude of the applied force. The magnetic field is proportional to the current through the coils of the electro-magnets, and can be readily controlled by controlling the current. Further, the direction of the force may be controlled by physically moving the electro-magnet(s) while passing the electric current therethrough, or turning one set of magnets on and another set of magnets off (i.e., altering the directionality of the applied force(s)). In another example, the desirable magnitude and direction of the force may be accomplished by placing a plurality of electro-magnets on the clutch plate, and passing a different electric current through each one and/or passing the electric current through selected electro-magnets, while others remain inactive. By altering the current through and/or the position of the electro-magnets enables one to control the rolling-to-sliding ratio.

In another embodiment, regular magnets may be used. In this embodiment, the position of the magnets may be mechanically changed in order to adjust the direction of the applied force. With regular magnets, turning one set of magnets on and another set of magnets off will also alter the directionality of the applied force(s). Stronger and weaker magnets may be used together, and in order to adjust the magnitude of the applied field, the stronger and/or weaker magnets may be turned on or off depending on the desirable field.

It is to be understood that the type of force applied to the nanoparticles 12 depends, at least in part, on the material selected for the nanoparticle core 20. In an example, if the nanoparticle core 20 is formed from a ferromagnetic material, then a magnetic force may be applied to the nanoparticles 12. In another example, if the nanoparticle core 20 has high permittivity, then an electrostatic force may be applied to the nanoparticle 12.

In an embodiment, the force is first applied to the nanoparticles 12 in a desirable direction to the surface 14 (e.g., at a 90° angle (i.e., normal to) with respect to the surface 14). At this force direction, the rolling and sliding of the particles 12 occurs in the same direction (i.e., perpendicular to the force direction), as shown in FIG. 3. The direction of the applied force may be altered in order to change the rolling-to-sliding ratio of the nanoparticles 12. It is to be understood that the altered angle/direction at which the force is applied generally corresponds to an angle (with respect to a longitudinal axis A of the particle 12) that is somewhere between the angle at which a pure rolling state of the nanoparticles 12 is achieved (e.g., force is applied 90° with respect to the axis A) and the angle at which a pure sliding state of the nanoparticles 12 is achieved (e.g., force is applied 0° with respect to the axis A). The respective angles at which pure rolling or pure sliding is achieved will depend, at least in part, on the surface asperities of the surface 14, the shape of the nanoparticles 12, etc. Since the angle between pure rolling and pure sliding is variable, altering the direction of the applied force affects the rolling-to-sliding ratio, and thus the friction characteristics. It is to be understood that when the direction of the force is adjusted, the value/magnitude of the force may be maintained.

In another embodiment, the force is applied to the nanoparticles 12 in a desirable direction with respect to the surface 14, and then the value/magnitude of the force is adjusted in order to achieve the desired rolling-to-sliding ratio. The value/magnitude of the force is the intensity of the force, and can be increased by increasing electric current applied thereto or decreased by decreasing electric current applied thereto.

Adjusting of the value or the direction of the force may be accomplished together or separately. In an example, the value and/or direction of the force may be adjusted by applying a different electric current through the magnet(s), moving the magnet(s), and/or switching the applied electric current from one magnet to another (as described above).

It is to be understood that the adjusting of the value of the force and/or the direction of the force is based, at least in part, on the roughness or the topography of the surface 14. For example, when the surface 14 contains large asperities, more fiction may be present and the particles 12 may be harder to roll.

In some instances, it may be desirable to concentrate the nanoparticles 12 at one or more preselected areas of the surface 14. Such instances may be advantageous when the actual contact area (between the surfaces 14, 14') is known. In such instances, the total amount of nanoparticles 12 may be reduced by attracting the nanoparticles 12 to load carrying areas (i.e., the actual contact areas) of the surfaces 14, 14', while leaving a reduced or minimum concentration of the nanoparticles 12 in non-load carrying areas of the surfaces 14, 14'. It is to be understood that the concentrating of the nanoparticles 12 in the load carrying area(s) depends, at least in part, on the surfaces 14, 14' used. For instance, if the lubricant is used for an artificial knee, it may be more desirable to distribute the lubricant throughout the entire nominal area of the knee, as opposed to a single critical spot. In contrast, it may be more desirable to concentrate the nanoparticles 12 in a clutch or engine application. It is to be understood that when the nanoparticles 12 are concentrated in the particular area(s), the nanoparticles 12 remain mobile so that the particles 12 can still rotate and/or slide relative to the motion of the moving surfaces 14, 14'. In an embodiment, the concentrating of the nanoparticles 12 may be accomplished by applying an anisotropic force to the nanoparticles 12. The direction of the anisotropic force applied will concentrate the nanoparticles 12 in the desirable manner. Accordingly, the nanoparticle core 20 may also be formed from a material that is responsive to the anisotropic force. Some non-limiting examples of such materials include indium, antimonide, and ferromagnetic uranium compounds.

While several examples have been described in detail, it will be apparent to those skilled in the art that the disclosed embodiments may be modified. Therefore, the foregoing description is to be considered exemplary rather than limiting.

The invention claimed is:

1. A method for controlling a coefficient of friction, comprising:
   providing a plurality of nanoparticles on a surface;
   moving the surface having the plurality of nanoparticles thereon;
   applying a force to the plurality of nanoparticles on the moving surface, the force being selected from a magnetic force, an electro-magnetic force, an electrostatic force, and combinations thereof; and
   controlling a rolling-to-sliding ratio of the plurality of nanoparticles on the moving surface by i) adjusting a value of the force applied to the plurality of nanoparticles relative to a value of tangential forces applied to achieve relative motion of the surface upon which the nanoparticles are provided, and ii) adjusting a direction of the force applied to the plurality of nanoparticles relative to a direction of tangential forces applied to achieve relative motion of the surface upon which the nanoparticles are provided.

2. The method as defined in claim 1 wherein the magnetic force is applied to the plurality of nanoparticles, and wherein each of the plurality of nanoparticles have a nanoparticle core including a ferromagnetic material that is responsive to the applied magnetic force.

3. The method as defined in claim 1 wherein each of the plurality of nanoparticles includes a nanoparticle shell formed from a material exhibiting an adhesiveness ranging from about 3 kT energy per inter-particle interaction to about 20 kT energy per inter-particle interaction, the material being selected from silanes, non-conductive phosphorus-based materials, non-conductive carbon-based surfactants, hydrocarbons, fluorocarbons, or combinations thereof.

4. The method as defined in claim 1 wherein the adjusting of the direction of the applied force affects an angle of the plurality of nanoparticles on the moving surface, the angle corresponding to an angle between a pure rolling state of the nanoparticles and a pure sliding state of the nanoparticles.

5. The method as defined in claim 4, further comprising maintaining the value of the force applied to the plurality of nanoparticles during the adjusting of the direction of the applied force.

6. The method as defined in claim 1 wherein an anisotropic force is applied to the plurality of nanoparticles, and wherein when the anisotropic force is applied to the plurality of nanoparticles on the moving surface, the anisotropic field concentrating the plurality of nanoparticles at one or more preselected areas of the moving surface.

7. The method as defined in claim 1 wherein the adjusting of i) the value of the force, or ii) the direction of the force is based on at least one of a roughness or a topography of the surface.

8. The method as defined in claim 1, further comprising adjusting the rolling-to-sliding ratio to achieve a controlled shift or slip in a limited slip differential transmission, a torque converter transmission, or a dual clutch transmission.

9. The method as defined in claim 1 wherein controlling includes adjusting both direction and intensity of the applied field.

10. The method as defined in claim 1 wherein the tangential forces applied to achieve relative motion of the surface are friction forces that are opposite to a direction of motion of the nanoparticles during a pure sliding state.

11. The method as defined in claim 1, further comprising decreasing the coefficient of friction by controlling the rolling-to-sliding ratio so that nanoparticle rolling is greater than nanoparticle sliding.

* * * * *